US012749668B2

(12) United States Patent
Li

(10) Patent No.: US 12,749,668 B2
(45) Date of Patent: Sep. 29, 2026

(54) LIGHT SOURCE

(71) Applicant: Yuanjun Li, Beijing (CN)

(72) Inventor: Yuanjun Li, Beijing (CN)

( * ) Notice: Subject to any disclaimer, the term of this patent is extended or adjusted under 35 U.S.C. 154(b) by 0 days.

(21) Appl. No.: 18/907,536

(22) Filed: Oct. 6, 2024

(65) Prior Publication Data

US 2025/0037986 A1 Jan. 30, 2025

Related U.S. Application Data

(63) Continuation of application No. PCT/CN2023/086852, filed on Apr. 7, 2023.

(51) Int. Cl.

| | |
|---|---|
| ***H01J 61/52*** | (2006.01) |
| ***H01J 61/02*** | (2006.01) |
| ***H01J 65/04*** | (2006.01) |

(52) U.S. Cl.

CPC .......... *H01J 61/523* (2013.01); *H01J 61/025* (2013.01); *H01J 65/042* (2013.01)

(58) Field of Classification Search

CPC ....... H01J 61/523; H01J 61/025; H01J 65/042

USPC ........................................................... 313/15

See application file for complete search history.

(56) References Cited

U.S. PATENT DOCUMENTS 3,384,773 A 5/1968 Kauer
2009/0147523 A1* 6/2009 Levon .................. F21S 10/005 362/350
2013/0216793 A1* 8/2013 Sasaki ................ G03G 9/08755 430/123.51
2019/0348898 A1* 11/2019 Frangen ............... H02K 41/033
2021/0396683 A1* 12/2021 Zhang ................ G01N 21/9505

FOREIGN PATENT DOCUMENTS

CN 1941271 A 4/2007
CN 113621919 A 11/2021

OTHER PUBLICATIONS

Espacenet Patent Search Complete (Global Dossier) (Year: 2026).*

* cited by examiner

*Primary Examiner* — James R Greece
*Assistant Examiner* — Hana S Featherly
(74) *Attorney, Agent, or Firm* — Pengju Shang

(57) ABSTRACT

An innovative light source is disclosed, comprising a heat radiator suspended within the light source without direct contact. This suspension is achieved through an electromagnetic levitation and induction heating unit that generates a high-frequency electromagnetic field. The same electromagnetic field simultaneously levitates and inductively heats the heat radiator to temperatures exceeding those of traditional thermoluminescent lamp radiators. By reaching this elevated temperature, the heat radiator enables the light source to attain high luminous efficacy, resulting in efficient lighting. This design eliminates the need for physical support structures or direct electrical connections to the heat radiator, reducing mechanical complexity and enhancing durability. The elevated operating temperature improves the proportion of visible light emission, thereby increasing the overall efficiency and performance of the light source compared to conventional technologies.

8 Claims, 1 Drawing Sheet

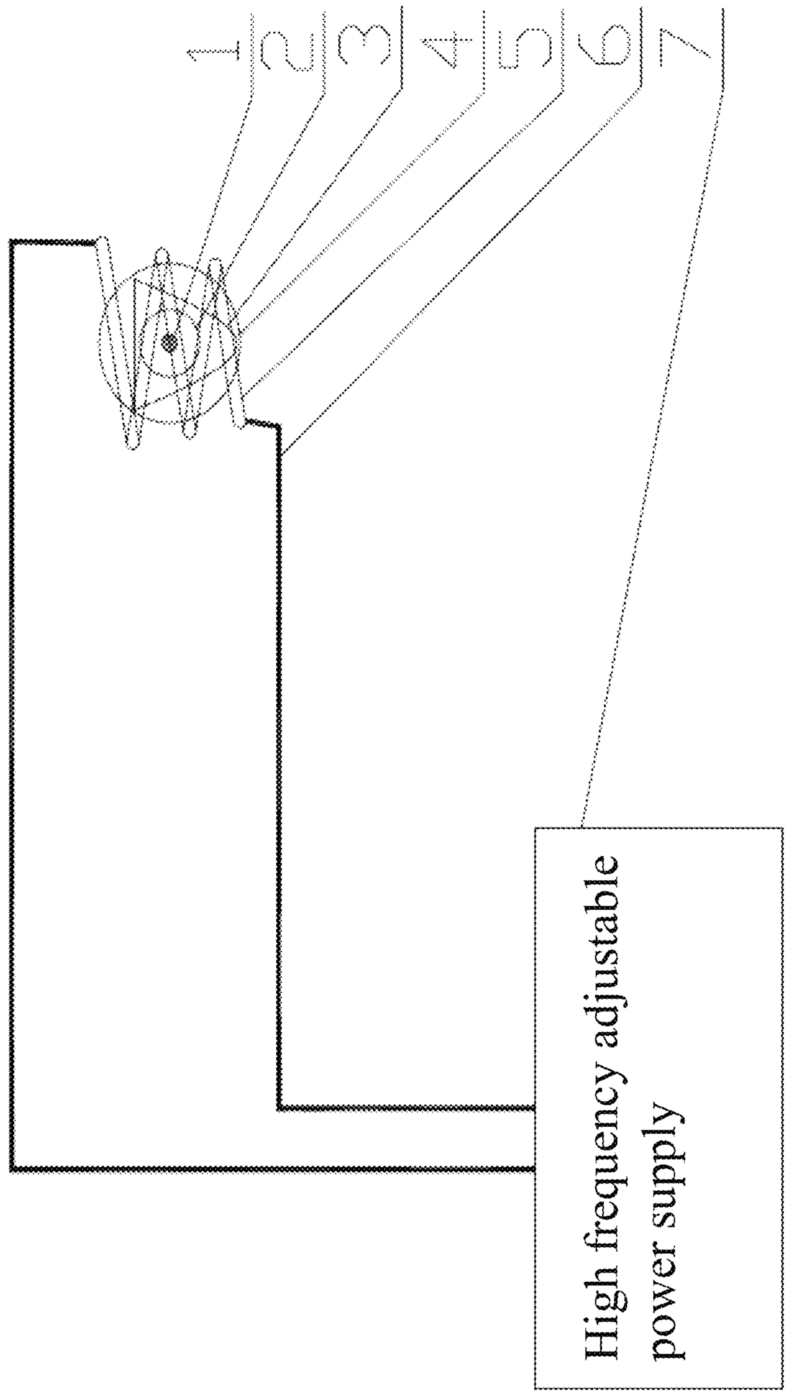
1
2
3
4
5
6
7
High frequency adjustable power supply

LIGHT SOURCE

CROSS-REFERENCE TO PRIORITY APPLICATIONS

This application is a bypass continuation of International Application No. PCT/CN2023/086852, filed on Apr. 7, 2023, which claims the benefit of priority to Chinese Patent Application No. 202210389311.6, filed on Apr. 14, 2022. The entire contents of the aforementioned applications are incorporated herein by reference.

TECHNICAL FIELD

The present invention pertains to the lighting field, in particular, relates to a new light source.

BACKGROUND

Since their invention, electric lights have been widely used and have brought great convenience to human production and daily life. Over the years, electric lights have evolved through several generations, including incandescent lamps, halogen lamps, gas discharge lamps, and LED lamps. This development trajectory reflects humanity's continuous pursuit of higher light efficiency, longer lifespan, and better light quality. This invention aims to provide a new type of electric light source that offers high light efficiency, long lifespan, and superior light quality.

SUMMARY

This invention relates to a new type of high-efficiency light source that utilizes electromagnetic levitation and induction heating. Specifically, a high-frequency electromagnetic field is employed to levitate and heat a heat radiator, which is suspended within a sealed bulb without direct contact with the bulb surface. The heat radiator is heated to a temperature significantly higher than that of traditional thermoluminescent lamps, enabling high luminous efficacy.

The light source system consists of several key components: a high-pressure gas-filled bulb, an optical reflector, a transparent front shield, an infrared reflective coating, an induction coil, external wires, and an external power supply. The infrared reflective coating is designed to recycle the infrared radiation, which contributes to increased energy efficiency. By incorporating this technology, the visible light luminous efficacy can be raised to over a predetermined threshold, such as 200 lm/W (lumens per watt), which is comparable to or even exceeds the efficiency of high-end commercial LED lamps.

The working process of the system is divided into three main stages:

Levitation Start and Preheating Stage:

Upon powering on, the heat radiator is electromagnetically levitated and gradually heated to a target temperature of approximately 5500K. This stage ensures that the radiator reaches the desired levitation position and temperature for efficient light emission.

Normal Working Stage:

During this stage, the power and frequency are balanced to maintain stable levitation and sustain the heat radiator at 5500K, which provides steady light output and effective halogen cycling. At this temperature, the total luminous efficacy in the visible light spectrum reaches approximately 140 lm/W, similar to high-end LED technologies. Combined with effective IRC (Infrared Reflective Coating) technology, the system can achieve visible light efficacy of over a predetermined threshold, such as 200 lm/W.

Maintenance and Cooling Stage:

When turning off the light, the power is gradually reduced while maintaining levitation to prevent the radiator from damaging the bulb due to high temperatures. A special warm-maintenance mode is implemented to optimize the halogen cycle and return any deposited tungsten back to the heat radiator. This process helps maintain the light source's longevity and luminous efficiency. The theoretical lifespan of this light source is nearly unlimited, as it is only constrained by the lifespan of the infrared reflective coating and the external power supply.

This invention offers several advantages over traditional lighting technologies, including the elimination of complex filament structures, higher operating temperatures, and increased energy efficiency through the use of IRC technology. These features make it an ideal solution for high-performance and long-lasting lighting applications.

BRIEF DESCRIPTION OF THE DRAWING

FIG. 1 illustrates a structural diagram of the light source, in accordance with some embodiments.

DETAIL DESCRIPTION OF THE EMBODIMENTS

A high-frequency power source is connected to a coil to generate a high-frequency oscillating electromagnetic field, which then acts on a heat radiator (which is a conductor) sealed inside the bulb. Under the influence of the electromagnetic field, the heat radiator generates induced turbulence, and the electromagnetic field generated by this induced turbulence will always be opposite to the electromagnetic field generated by the coil. Consequently, the heat radiator is suspended within the bulb by the magnetic force, avoiding contact with the bulb's inner surface. The heat radiator is continuously heated by the induced turbulence until it reaches an incandescent light-emitting state. At this point, maintaining a balance between the power input and the power consumption of the light source results in a stable thermoluminescent lamp.

The advantage of this invention is that the heat radiator does not come into direct contact with the bulb and is suspended inside the bulb by the magnetic field. Additionally, the heat radiator does not rely on wires or bracket structures for power supply, eliminating the need for a complicated and fragile filament structure, or even for maintaining its solid state. As a result, the limitation of the heat radiator's melting point can be overcome, allowing its temperature to be significantly increased, thereby achieving high-efficiency light emission. To address the higher evaporation rate caused by the increased temperature, a halogen cycle is used. For better evaporation suppression, the composition, total amount, and pressure of the halogen vapor can be adjusted as needed. Moreover, special operations can be incorporated during the working process of the light source.

FIG. 1 illustrates a structural diagram of the light source, in accordance with some embodiments. FIG. 1 includes the following components:

1. Heat Radiator

2. High-Pressure Gas-Filled Bulb

3. Optical Reflector and Transparent Front Shield

4. Outer Infrared Reflective Coating on the Bulb

5. Induction Coil

6. External Wires
7. External Power Supply

In order to better illustrate the content and practical applicability of this invention, a specific embodiment is provided below. It should be understood that the claims and scope of application of this invention are not limited to the embodiment described herein.

In this embodiment, a target heat radiation temperature of 5500K is selected. This temperature is very close to the heat radiation temperature of the solar spectrum and is also near the boiling point of tungsten at standard atmospheric pressure, making it an ideal target temperature. As for the choice of the heat radiator 1, considering overall cost-effectiveness, the most suitable material is still the traditional filament material-tungsten. Therefore, tungsten may be used as the heat radiator in this embodiment.

To manufacture the high-pressure gas-filled bulb 2, silica glass, which is the traditional material used for halogen lamp bulbs, can be utilized. The shape and size should be adjusted accordingly to ensure the halogen cycle functions properly. In terms of the pressure, total amount, and composition of the halogen gas, there are no fundamental differences from traditional halogen lamps. Only minor adjustments are needed to accommodate the higher temperature and the increased evaporation rate of tungsten in this case.

The high-pressure gas-filled bulb 2 may be coated with an infrared reflective layer to recycle the energy from infrared radiation, a technology known as IRC (Infrared Reflective Coating) in the lighting industry. With current mature technologies used in traditional halogen lamps, energy savings of approximately 30% (about 40% of the total infrared radiation) can be achieved. One major limitation of this technology is the difficulty in focusing the infrared reflective light onto the fine structure of a traditional filament. However, in this invention, the heat radiator is almost a solid sphere, which is highly conducive to the focusing of infrared reflective light. Additionally, a second infrared reflective layer can be considered, and it is foreseeable that the proportion of recycled infrared radiation could reach higher levels, approximately 70% to 80%.

The optical reflector and transparent front shield 3 are similar to the components used in traditional halogen lamp cups, and their technology is already well established. Therefore, no further description is provided here. It should be noted that the optical reflector and transparent front shield are primarily included for case of application and are not essential components of this invention.

In traditional halogen lamps, the proportion of visible light radiation is relatively low—much of the energy is emitted as infrared radiation, which does not contribute to illumination and results in inefficient energy utilization. Additionally, the power output of individual halogen lamps is limited due to the constraints of the filament structure, which cannot withstand higher temperatures or power levels without degrading. Because of these factors, adding an outer infrared reflective coating (component 4) to recycle mid-infrared and far-infrared radiation is not economically viable in traditional halogen lamps. The cost and complexity of applying such a coating do not justify the minimal efficiency gains, given the low proportion of visible light and limited power output. As a result, existing IRC (Infrared Reflective Coating) technology primarily focuses on recycling near-infrared radiation, which contains a higher proportion of energy and can be more effectively converted back into heat to enhance the efficiency of visible light emission. This approach improves efficiency modestly while keeping production costs reasonable. The mid-infrared and far-infrared parts of the spectrum, containing less energy and offering diminishing returns on efficiency when recycled, are largely ignored in conventional designs.

In contrast, this invention significantly increases the proportion of visible light radiation emitted by the heat radiator. For instance, at a target temperature of 5500K, the visible light radiation can reach approximately 44.9% of the total emitted energy. Furthermore, because the heat radiator is levitated and heated via electromagnetic induction—eliminating reliance on a physical filament structure—the power output of a single lamp is no longer constrained by material limitations. The lamp's power can be increased as needed without the risk of structural failure or degradation. This higher power output, combined with the increased proportion of visible light, enhances the overall energy efficiency of the lamp. Consequently, recycling the mid-infrared and far-infrared radiation becomes more economically feasible in this context. The additional energy recovered from these parts of the spectrum contributes significantly to the lamp's performance due to the higher operating temperatures and power levels. Therefore, it is advantageous to add an outer (outside of component 2 and 3) infrared reflective coating on the bulb (component 4) to recycle these otherwise wasted portions of the spectrum, further improving the lamp's efficiency by redirecting infrared radiation back to the heat radiator to sustain its high temperature and enhance visible light emission. In some embodiments, the infrared reflective coating may be applied to the inner surface or the outer surface of the bulb.

Of course, the coatings can also be integrated into components 2 or 3, but doing so may increase the complexity of design and production.

The induction coil 5 is typically made by winding copper wires or tubes and has been widely applied in the electromagnetic levitation heating industry, providing a mature reference for use in this invention.

The external wires 6 have no special requirements. It is worth noting that, since the wires in this invention do not come into contact with the lamp base, which has a high operating temperature, the heat resistance requirements for the wire sheaths are significantly reduced, thereby lowering the risk of fire hazards.

The external power supply 7 should be adjustable to allow for real-time control of various output parameters, ensuring compatibility with the lamp throughout the entire working process.

In some embodiments, the working process of the entire system in this invention can be divided into three stages:

Levitation Start and Preheating Stage:

When the light is turned on and the power is supplied, the system initially operates at a low power level and adjusts the output frequency to make component 1 levitate at the designed ideal position in the light center. This position can be further calibrated using suitable mechanical structures. Then, the power is gradually increased to heat component 1 to approximately 5500K, the target temperature of the design. At this point, component 1 is in a molten, levitated, and incandescent state. The system then transitions into the next stage of normal operation.

Normal Working Stage:

During this stage, the frequency and power of the power supply are maintained to ensure that the power consumed by the light source is balanced with the power output from the power supply. This allows component 1 to maintain stable electromagnetic levitation and reach the target radiation temperature of 5500K, thereby enabling the intended light emission and halogen cycle. At this temperature, based on the relationship between heat radiation energy and wavelength, and by fitting it to the human visual sensitivity curve (for photopic vision), the total luminous efficacy in the visible light spectrum is calculated to be approximately 140 lm/W, which is comparable to the performance level of high-end commercial LEDs.

Furthermore, with effective IRC technology recycling the infrared radiation, the visible light luminous efficacy could potentially exceed 200 lm/W. The optical spectrum closely resembles that of natural light. It is worth noting that, due to the higher proportion of shortwave and ultraviolet components in the light spectrum produced by this invention, it is highly conducive to using phosphor powder to adjust the spectrum distribution according to specific requirements. Proper utilization of this characteristic can achieve even higher luminous efficacy or meet diverse application needs.

Maintenance and Cooling Stage

When turning off the light, it is crucial not to cut off the power supply immediately, as the temperature of component 1 during the normal working stage is very high and remains in a molten state. Instead, the power supply should continue operating at a level that keeps component 1 levitated while gradually reducing the power output, allowing component 1 to cool down to a temperature that the bulb can withstand. Afterward, the frequency (previous studies have shown a positive correlation between frequency and electromagnetic levitation force) and power output should be gradually lowered until component 1 slowly descends and lands at the bottom of component 2. Only then should the power supply be completely turned off.

It should be noted that, due to the high working temperature of this invention, the evaporation rate of component 1 will inevitably be higher than that in traditional light sources, and it is expected that the evaporation rate may exceed the rate of the halogen cycle. To address this issue, a warm-maintenance work mode has been specially designed. In this mode, the power supply parameters are adjusted to ensure that the inner surface temperature of component 2 satisfies the requirements for the halogen cycle, while the temperature of component 1 is only slightly above the halogen cycle temperature (a little over 1400K, much lower than the normal working temperature). At this temperature, the evaporation rate is very low, and the halogen cycle rate will definitely be higher than the evaporation rate. This allows any tungsten deposition that may have formed on the inner surface of component 2 during normal operation due to an insufficient halogen cycle rate to be eliminated and returned to component 1.

This mode can be configured to automatically activate for a period of time whenever the light is turned off or after the light has been used for a certain number of hours. Implementing this mode can significantly extend the lifespan of the light source and maintain its luminous efficiency. Under ideal conditions, the theoretical lifespan of the light source itself is almost unlimited (the lifespan of lamps incorporating IRC technology may be limited by the lifespan of the infrared reflective coating). Therefore, the overall system lifespan in practical applications depends on the durability and stability of the external power supply, so special attention should be paid to the selection of compatible power sources.

Further discussions on related technologies are beyond the scope of this document and will be covered in separate studies.

What is claimed is:

1. A light source, comprising:

a heat radiator, wherein the heat radiator is a conductor;

a high-pressure halogen gas-filled bulb housing the heat radiator; and an electromagnetic levitation and induction heating unit comprising an induction coil and a power supply coupled to the induction coil, wherein the power supply is configured to drive the induction coil to generate a high-frequency electromagnetic field that (1) simultaneously suspends the heat radiator within the bulb that is free of contact with an inner surface of the bulb and (2) heats the heat radiator by electromagnetic induction to an incandescent state of a target temperature of 5500K, wherein the high-frequency electromagnetic field acts on the heat radiator to generate induced turbulence, and the heat radiator is heated by the induced turbulence until it reaches an incandescent light-emitting state, and wherein the heat radiator, when heated to the target temperature, enables the light source to achieve high luminous efficacy for efficient lighting.

2. The light source of claim 1, wherein the high-pressure gas is configured to support a halogen cycle within the bulb for maintaining a stability and lifespan of the heat radiator at the elevated temperature.

3. The light source of claim 2, wherein the gas-filled bulb comprises a halogen gas mixture, and concentration, pressure, and composition of the halogen gas are configured to optimize a halogen cycle rate and minimize an evaporation rate of the heat radiator at high operating temperatures.

4. The light source of claim 1, further comprising:

an infrared reflective coating applied to a surface of the bulb, wherein the infrared reflective coating is configured to recycle infrared radiation emitted by the heat radiator, thereby enhancing energy efficiency and reducing power consumption.

5. The light source of claim 4, wherein the infrared reflective coating is configured to recycle mid-infrared and far-infrared radiation in addition to near-infrared radiation, and is capable of achieving a visible light luminous efficacy exceeding a predetermined threshold.

6. The light source of claim 1, wherein the electromagnetic levitation and induction heating unit are configured to operate in three stages, including:

a levitation start and preheating stage, in which the heat radiator is levitated and heated to a target temperature;

a normal working stage, in which a power and a frequency of the electromagnetic field are balanced to maintain the heat radiator at the target temperature for stable light emission; and a maintenance and cooling stage, in which the power and frequency are gradually decreased to lower the temperature of the heat radiator while maintaining levitation until the heat radiator settles at the bottom of the bulb.

7. The light source of claim 6, further comprising:

a warm-maintenance work mode configured to maintain the temperature of the heat radiator slightly above a halogen cycle temperature during cooling, wherein the warm-maintenance work mode removes tungsten deposition on the bulb surface and returns it to the heat radiator to preserve the luminous efficiency of the light source.

8. The light source of claim 1, wherein the heat radiator is made of tungsten, and the light source emits visible light that closely resembles a natural light spectrum.

* * * * *